(12) United States Patent
Kawai

(10) Patent No.: US 10,389,191 B2
(45) Date of Patent: Aug. 20, 2019

(54) STATOR AND ELECTRIC MOTOR HAVING TIGHTENING ROD FOR COUPLING HOUSINGS

(71) Applicant: FANUC CORPORATION, Yamanashi (JP)

(72) Inventor: Yasuo Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 29 days.

(21) Appl. No.: 15/655,978

(22) Filed: Jul. 21, 2017

(65) Prior Publication Data

US 2018/0026484 A1  Jan. 25, 2018

(30) Foreign Application Priority Data

Jul. 25, 2016 (JP) .................................. 2016-145244

(51) Int. Cl.
*H02K 1/18* (2006.01)
*H02K 1/12* (2006.01)
*H02K 15/02* (2006.01)

(52) U.S. Cl.
CPC .............. *H02K 1/185* (2013.01); *H02K 1/12* (2013.01); *H02K 15/02* (2013.01)

(58) Field of Classification Search
CPC ........... H02K 1/12; H02K 1/185; H02K 15/02
USPC ................................................. 310/216.058
See application file for complete search history.

(56) References Cited

U.S. PATENT DOCUMENTS

| | | | |
|---|---|---|---|
| 4,626,725 A | 12/1986 | Kawada et al. | |
| 5,043,616 A | 8/1991 | Katsuzawa et al. | |
| 5,079,466 A | 1/1992 | Jones | |
| 5,138,243 A | 8/1992 | Kress et al. | |
| 5,170,851 A | 12/1992 | Kress et al. | |
| 5,196,747 A | 3/1993 | Kress et al. | |
| 5,828,152 A | 10/1998 | Takeda et al. | |

(Continued)

FOREIGN PATENT DOCUMENTS

| | | |
|---|---|---|
| CN | 1240540 A | 1/2000 |
| DE | 39 23 421 C2 | 11/1992 |

(Continued)

OTHER PUBLICATIONS

Japanese Decision to Grant a Patent dated Jun. 26, 2018, in connection with corresponding JP Application No. 2016-145244 (6 pgs., including English translation).

(Continued)

*Primary Examiner* — Julio C. Gonzalez
*Assistant Examiner* — Rashad H Johnson
(74) *Attorney, Agent, or Firm* — Maier & Maier, PLLC

(57) ABSTRACT

A stator including a stator core formed by stacking steel sheets each having a through hole penetrating in a thickness direction, a pair of housings arranged at positions sandwiching the stator core, each housing including a screw hole arranged at a position aligning with the through hole, and a tightening rod that penetrates the through hole of the stator core, and that includes male threads that are screwed into the screw holes of the housings. The male thread on one end is a right-hand thread and the male thread on another end is a left-hand thread. Further, an engaging portion that is engaged with a tool for turning the tightening rod is provided in at least one end surface of the tightening rod.

7 Claims, 7 Drawing Sheets

(56) References Cited

U.S. PATENT DOCUMENTS

| | | | |
|---|---|---|---|
| 6,006,418 A | 12/1999 | Takeda et al. | |
| 6,787,262 B2* | 9/2004 | Wakahoi | H01M 8/247 |
| | | | 429/471 |
| 2003/0071189 A1* | 4/2003 | Petkau | E04G 17/0657 |
| | | | 249/190 |
| 2011/0048616 A1* | 3/2011 | Barnett | F16J 13/14 |
| | | | 156/156 |
| 2014/0084728 A1* | 3/2014 | Iwasaki | H02K 3/00 |
| | | | 310/156.01 |
| 2016/0049843 A1* | 2/2016 | Lin | H02K 5/04 |
| | | | 310/49.01 |
| 2016/0245285 A1* | 8/2016 | Tanito | F04C 2/1075 |
| 2017/0051854 A1 | 2/2017 | Bird | |

FOREIGN PATENT DOCUMENTS

| EP | 0172918 A1 | 3/1986 |
|---|---|---|
| JP | S59-191846 U | 12/1984 |
| JP | 63-217941 A | 9/1988 |
| JP | H02-13541 B | 4/1990 |
| JP | H03-21944 U | 3/1991 |
| JP | 6-141515 A | 5/1994 |
| JP | 8-223833 A | 8/1996 |

OTHER PUBLICATIONS

Japanese Search Report dated May 24, 2018, in connection with corresponding JP Application No. 201-145244 (15 pgs., including English translation).

German Office Action dated Jan. 31, 2019, in connection with corresponding DE Application No. 10 2017 212 551.9 (9 pgs., including English translation).

Office Action dated Jun. 5, 2019 in corresponding Chinese Application No. 201710601094.1; 13 pages including English-language translation.

* cited by examiner

STATOR AND ELECTRIC MOTOR HAVING TIGHTENING ROD FOR COUPLING HOUSINGS

CROSS-REFERENCE TO RELATED APPLICATIONS

This application is based on and claims priority to Japanese Patent Application No. 2016-145244 filed on Jul. 25, 2016, the entire content of which is incorporated herein by reference.

TECHNICAL FIELD

The present invention relates to a stator and an electric motor.

BACKGROUND ART

Conventionally, an electric motor is known which is provided with a stator having a structure in which a stator core stacking a large number of electromagnetic steel sheets are sandwiched and fixed by a pair of housings that are arranged at positions sandwiching the stator core in a stacking direction and that are forced in directions toward each other by tightening bolts penetrating the stator core in the stacking direction (for example, see PTL 1).

CITATION LIST

Patent Literature

{PTL 1}
Japanese Examined Patent Application, Publication No. H2-13541

SUMMARY OF INVENTION

An aspect of the present invention provides a stator including a stator core that is formed by stacking a plurality of steel sheets each having a through hole penetrating the steel sheet in its thickness direction; a pair of housings that are arranged at positions sandwiching the stator core in a stacking direction, each housing including a screw hole arranged at a position aligning with the through hole; and a tightening rod that penetrates the through hole of the stator core and that includes male threads that are respectively screwed into the screw holes of the housings, wherein the male thread on one end of the tightening rod is a right-hand thread, and the male thread on another end is a left-hand thread, and wherein an engaging portion that is engaged with a tool for turning the tightening rod around a longitudinal axis of the tightening rod is provided in at least one end surface of the tightening rod.

DESCRIPTION OF EMBODIMENTS

A stator 1 and an electric motor according to an embodiment of the present invention will be described below with reference to the drawings.

Figure 1:
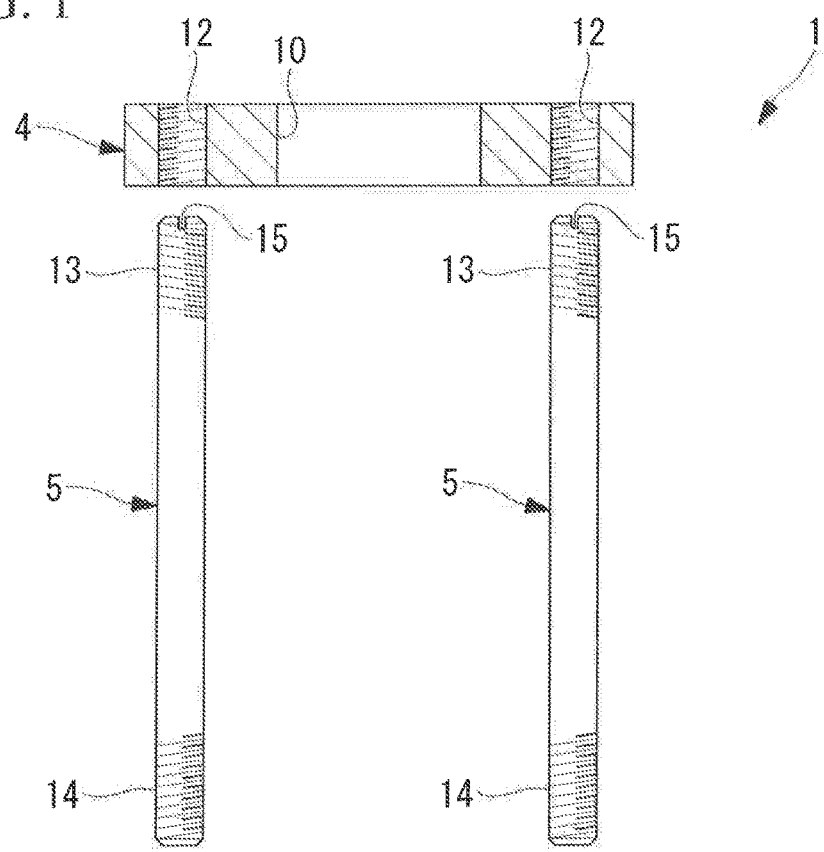
FIG. 1 is an exploded longitudinal cross-sectional diagram showing a stator according to an embodiment of the present invention.
Figure 1:
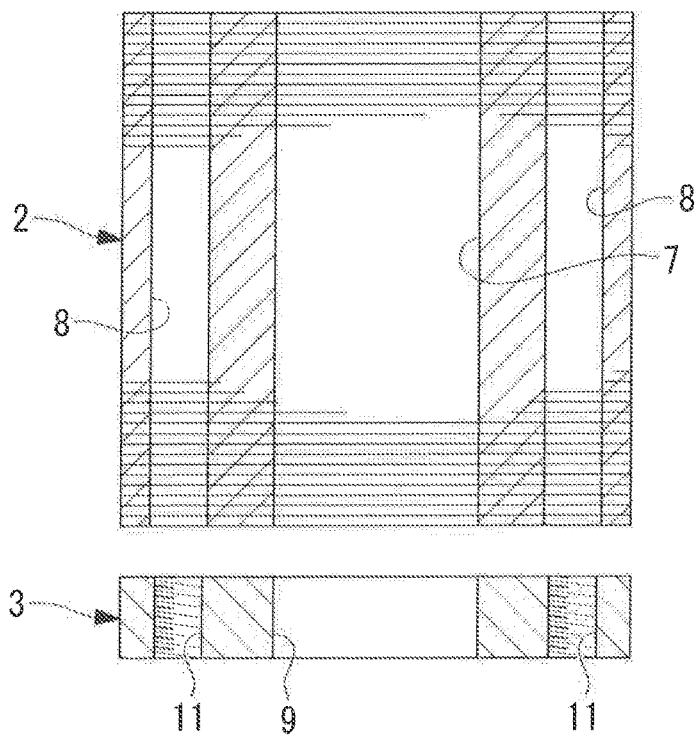
Figure 1:
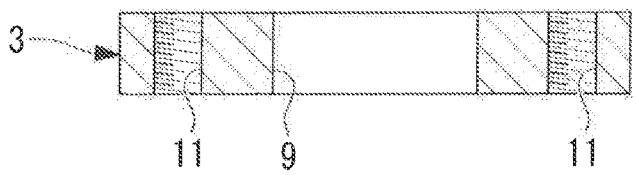

The stator 1 according to the present embodiment is provided in an electric motor, and as shown in FIG. 1, includes a stator core 2 formed by stacking a plurality of electromagnetic steel sheets, a pair of housings 3, 4 arranged at respective ends of the stator core 2 in a stacking direction, and one or more tightening rods 5 which are tightened so as to couple the housings 3, 4.

Each electromagnetic steel sheet constituting the stator core 2 includes, at the center, a relatively large center hole 7 penetrating in a thickness direction, and includes, at a periphery of the stator core, a plurality of through holes 8 with a smaller diameter dimension than the center hole 7, the through holes 8 are arranged with intervals in a circumferential direction and penetrate in the thickness direction.

The stator core 2 is formed by stacking a plurality of electromagnetic steel sheets with the center holes 7 and the through holes 8 aligning with one another.

Grooves forming tooth cores, not shown, extending inward in a radial direction are formed in the stator core 2, and an excitation winding, not shown, is wound on each tooth core using the groove. Furthermore, a rotor, not shown, which is supported in a manner capable of being rotated around a center axis of the center hole 7 is arranged in the center hole 7 of the stator core 2.

In the example shown in the drawing, the pair of housings 3, 4 are flat plate members having a predetermined thickness, and the housings 3, 4 are each provided with a center hole 9, 10 and a plurality of screw holes 11, 12, which are formed at positions that respectively align with the center hole 7 and the plurality of through holes 8 when the housings 3, 4 are arranged at end portions of the stator core 2. Female threads of the screw holes 11 of one housing 3 are right-hand threads, and female threads of the screw holes 12 of the other housing 4 are left-hand threads. In the present embodiment, the screw holes 11, 12 of the housings 3, 4 penetrate the housings 3, 4 in the thickness direction. The shape of the housings 3, 4 is not limited to a flat plate shape.

The tightening rod 5 is a member which has a round bar shape and which is provided with male threads 13, 14 on respective ends, and in the example shown in FIG. 1, one end is provided with a slot (engaging portion) 15 where a tip end of a flathead screwdriver (tool) 6 can be engaged, for example. The male thread 13 at the end portion where the slot 15 is provided is a left-hand thread, and the male thread 14 at an end portion where the slot 15 is not provided is a right-hand thread. In the example shown in FIG. 1, the male threads 13, 14 provided on the respective ends of the tightening rod 5 have the same pitch.

Figure 2:
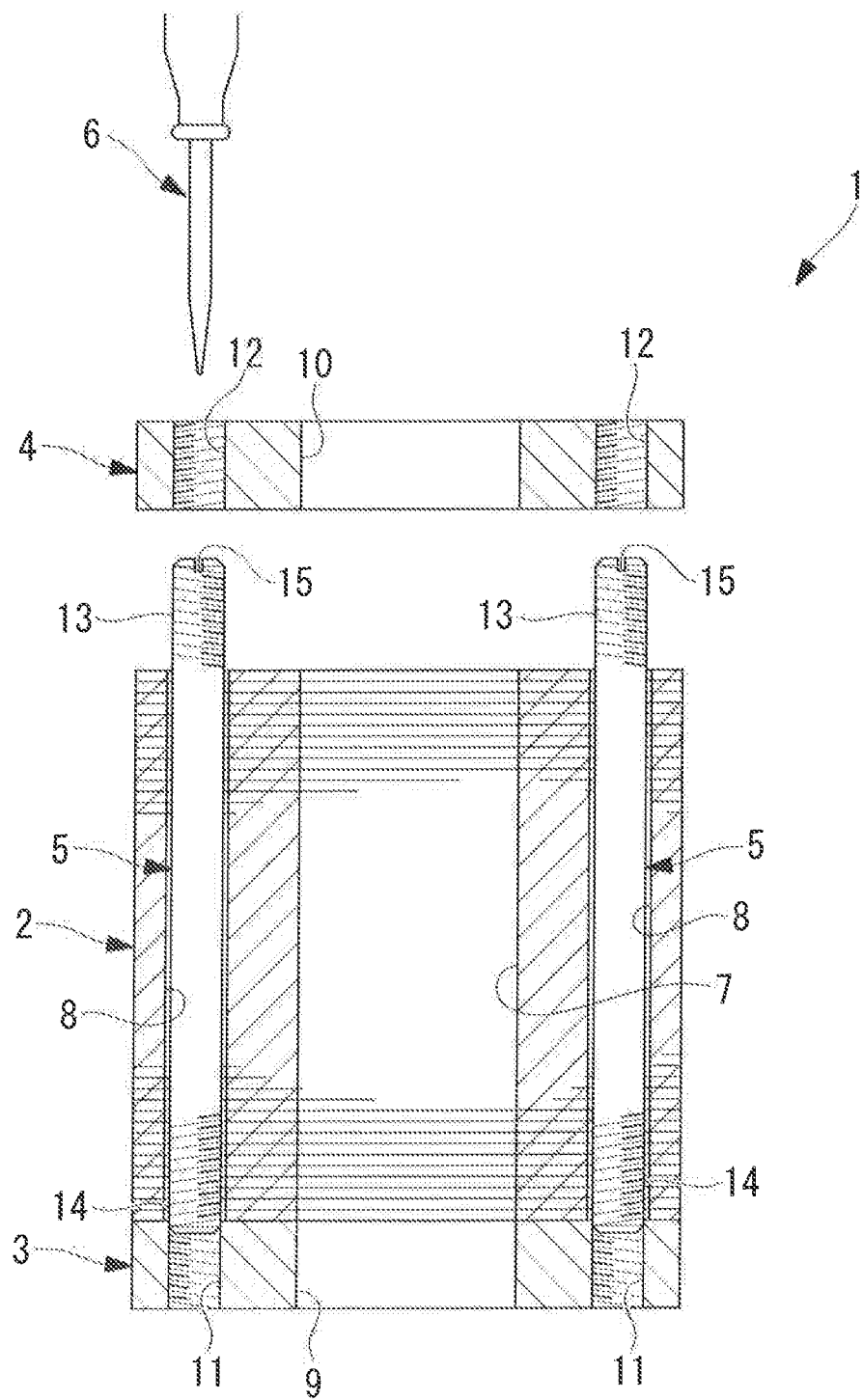
FIG. 2 is a longitudinal cross-sectional diagram showing a state before start of a tightening operation of a tightening rod of the stator in FIG. 1.

As shown in FIG. 2, to assemble the stator 1 according to the present embodiment, which is configured as described above, the housing 3 having the screw holes 11 with right-hand threads is horizontally arranged, and the right-hand male threads 14 of the tightening rod 5 are temporarily tightened in all the screw holes 11 of the housing 3. In this state, the stator core 2 is arranged with the through holes 8 aligning with upper ends of all the tightening rods 5 standing perpendicularly above the housing 3, and the stator core 2 is lowered with the tightening rods 5 as guides. Phase alignment is thereby performed in such a way that the center hole 7 and the through holes 8 of the stator core 2 align with the center hole 9 and the screw holes 11 of the housing 3.

In this state, the upper ends of the tightening rods 5 are arranged above the stator core 2, after going through the through holes 8 of the stator core 2, and the housing 4 having the screw holes 12 with left-hand threads is placed with the screw holes 12 aligning with the upper ends of the respective tightening rods 5.

Figure 3:
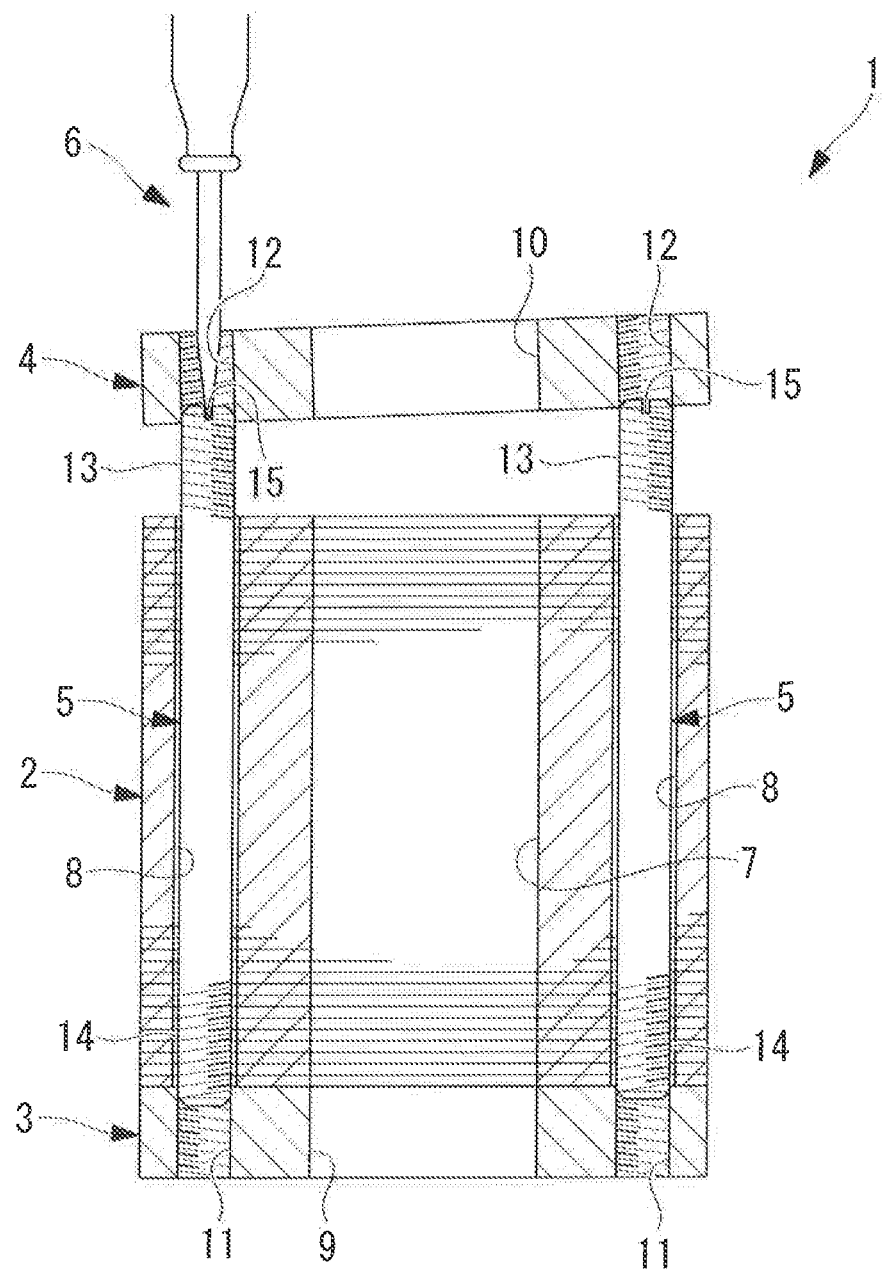
FIG. 3 is a longitudinal cross-sectional diagram showing a state where the tightening operation of the tightening rod by a tool has been started from the state shown in FIG. 2.

Moreover, as shown in FIG. 3, the tip end of the flathead screwdriver 6 is inserted into the screw hole 12 from above the housing 4 on the upper side, and the flathead screwdriver 6 is engaged with the slot 15 arranged on the upper end of the tightening rod 5, and the flathead screwdriver 6 is turned clockwise, which is a normal tightening direction.

Figure 4:
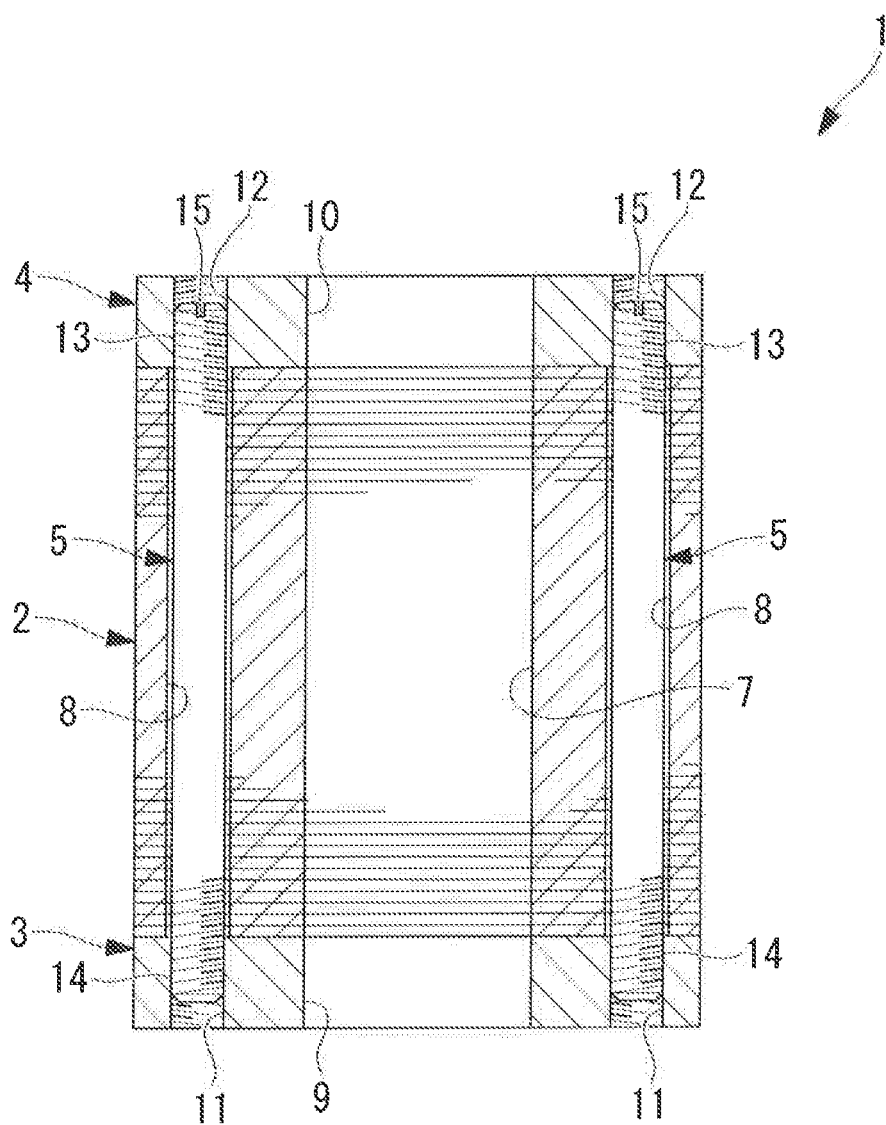
FIG. 4 is a longitudinal cross-sectional diagram showing a state where the stator in FIG. 1 has been assembled.

The tightening rod 5 is thereby turned around its longitudinal axis, and tightening of the right-hand male thread 14 arranged at a lower end of the tightening rod 5 and the screw hole 11, with the right-hand thread, of the housing 3 on the lower side is performed, and also, tightening of the left-hand male thread 13 arranged at the upper end of the tightening rod 5 and the screw hole 12, with the left-hand thread, of the housing 4 on the upper side is started. By turning all the tightening rods 5 little by little, one by one, around the longitudinal axes of the tightening rods 5, tightening of the male threads 13, 14 on respective ends of the tightening rods 5 and the screw holes 11, 12 of the housings 3, 4 are evenly performed, and finally, as shown in FIG. 4, the stator core 2 is fixed in a compressed state by being sandwiched between the pair of upper and lower housings 3, 4 in a stacking direction.

As described above, according to the stator 1 of the present embodiment, the stator core 2 is sandwiched and fixed between the housings 3, 4 by tightening of the male threads 13, 14 on respective ends of the tightening rod 5 and the screw holes 11, 12 of respective housings 3, 4, and thus, a bolt seat surface does not have to be provided in either of the housings 3, 4, and a space for forming a bolt seat surface does not have to be provided around the tightening rod 5. That is, it is sufficient if a space for securing a minimum thickness required for strength is provided around the screw holes 11, 12 of the housings 3, 4, and thus, there are advantages that space may be saved, the stator 1 may be miniaturized, and the electric motor including the stator 1 may be miniaturized.

Also, the male threads 13, 14 on respective ends of the tightening rod 5 may be tightened into the screw holes 11, 12 simply by engaging the tip end of the flathead screwdriver 6 with the slot 15 provided at one end of the tightening rod 5 and by turning the flathead screwdriver 6 clockwise. Accordingly, there are advantages that, compared to a case of separately tightening bolts at respective ends of the tightening rod 5, the tightening operation may be simplified, and the number of steps required for assembly operation may be reduced.

Moreover, in the present embodiment, the slot 15 is provided on an end surface on the side where the left-hand male thread 13 is provided, and thus, the male threads 13, 14 on respective ends of the tightening rod 5 may be tightened simultaneously with the screw holes 11, 12 of the pair of housings 3, 4 simply by turning clockwise, which is the normal tightening direction, the flathead screwdriver 6 which is engaged at the tip end with the slot 15, and the assembly operation may be easily performed.

Additionally, in the present embodiment, the slot 15 is provided at one end of the tightening rod 5, but the slot 15 may alternatively be provided at both ends. Also, the slot 15 is adopted as an engaging portion, but instead, an arbitrary engaging portion allowing engagement of a tip end of a Phillips head screwdriver (tool), such as a cross-shaped concave portion, a hexagon socket, a hexalobe, or a hexagon head, may be adopted.

Figure 5:
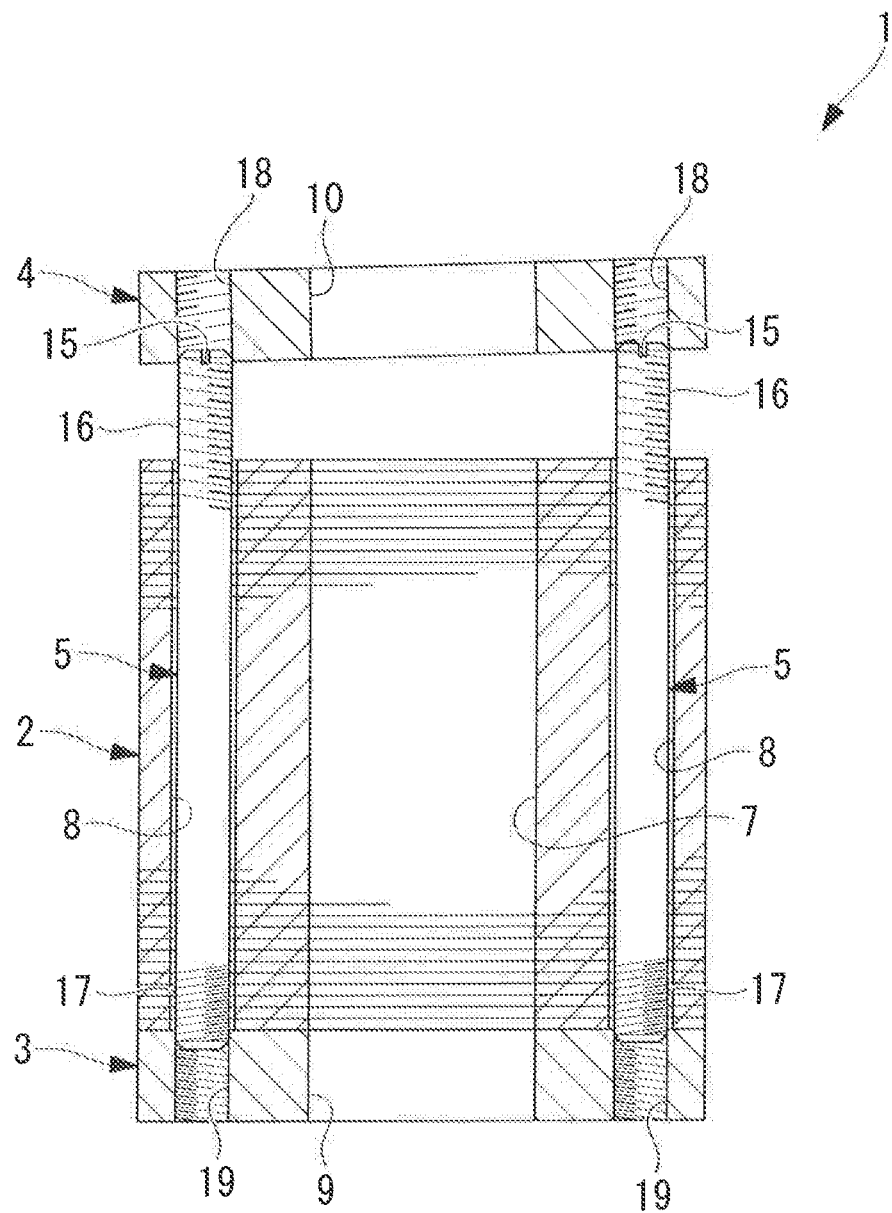
FIG. 5 is a longitudinal cross-sectional diagram showing a first modified example of the stator shown in FIG. 1, where male threads with different pitches are provided on respective ends of the tightening rod.

Moreover, in the present embodiment, as shown in FIG. 5, the pitch of the male thread 16 and the pitch of the male thread 17, which are located at the respective ends of the tightening rod 5, may be made different, and the pitch of the screw hole 18 and the pitch of the screw hole 19, with which the male threads 16, 17 are engaged, may be made different.

In the example shown in FIG. 5, the male thread 17 with a smaller pitch is a right-hand thread, and the male thread 16 with a greater pitch is a left-hand thread, and the slot 15 is provided on the side of the male thread 16 with the greater pitch.

Accordingly, in the case of performing the same assembly operation as described above by temporarily tightening the male thread 17 with the smaller pitch into the screw hole 19, of the housing 3, with a small pitch, there are advantages that, because the amount of lowering of the tightening rod 5 caused by the progress of tightening can be made small, the amount of shift from another tightening rod 5 may be suppressed to a low level, and the ease of tightening may be increased. That is, if tightening, into the screw hole 19, of the male thread 17 of only one tightening rod 5 proceeds greatly, tightening cannot be performed due to other tightening rods 5 protruding out, but if the pitch is reduced, the amount of movement in the longitudinal axis direction of the tightening rod 5 may be reduced, and other tightening rods 5 maybe easily tightened.

Figure 6:
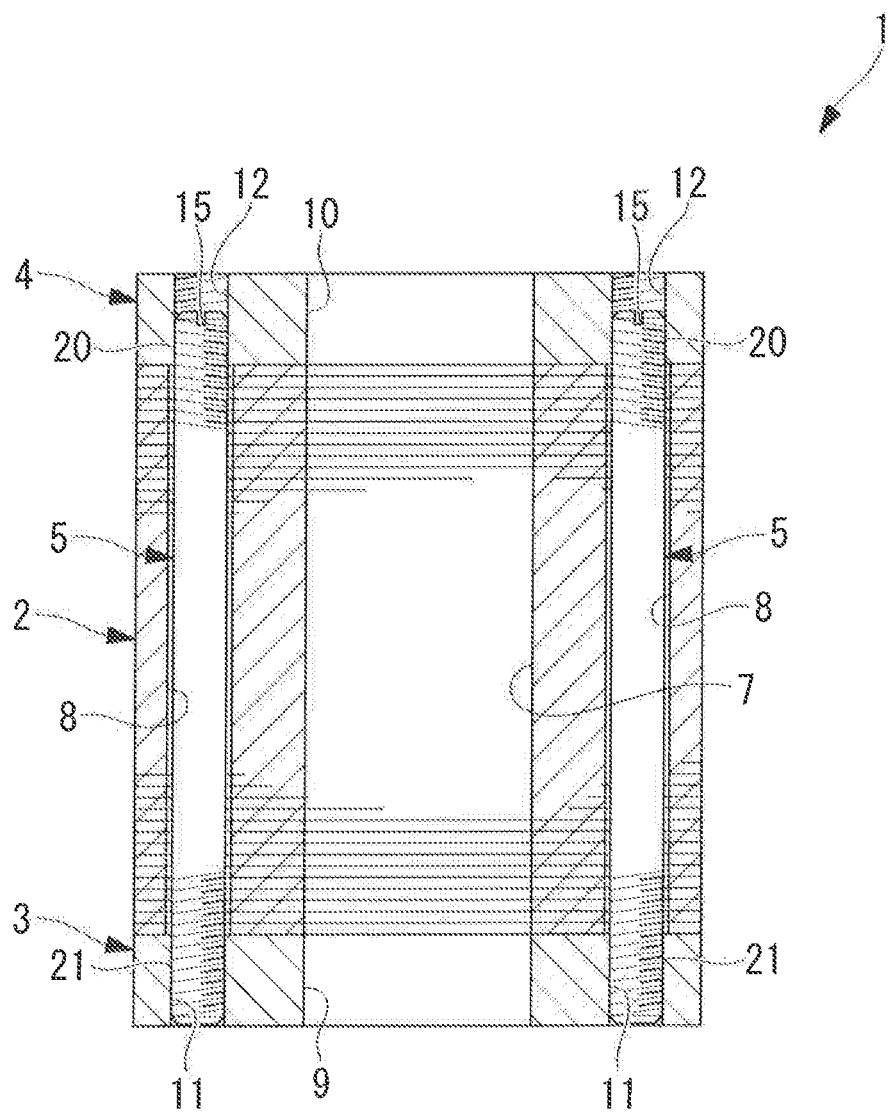
FIG. 6 is a longitudinal cross-sectional diagram showing a second modified example of the stator shown in FIG. 1, where male threads with different numbers of turns are provided on respective ends of the tightening rod.

Furthermore, as shown in FIG. 6, in the present embodiment, the number of turns of the male thread 20 and the number of turns of the male thread 21, which are provided on the respective ends of the tightening rod 5, may be made different. That is, the number of turns of the male thread 21, which is temporarily tightened with the housing 3 first, is increased to achieve an advantage that the ease of assembly is increased by prevention of a situation where there is not sufficient male thread 21 when finalizing the tightening.

As shown in FIG. 6, in the case where the pitch is the same for the male threads 20, 21 on respective ends of the tightening rod 5, the different numbers of turns result in different thread lengths, but in the case where the pitch is different between the male threads 20, 21, the different numbers of turns do not necessarily result in different thread lengths. By making the numbers of turns different, a situation where there is not sufficient male thread 21 when finalizing the tightening may be prevented if temporary tightening is performed using the male thread 21 with a greater number of turns.

Figure 7:
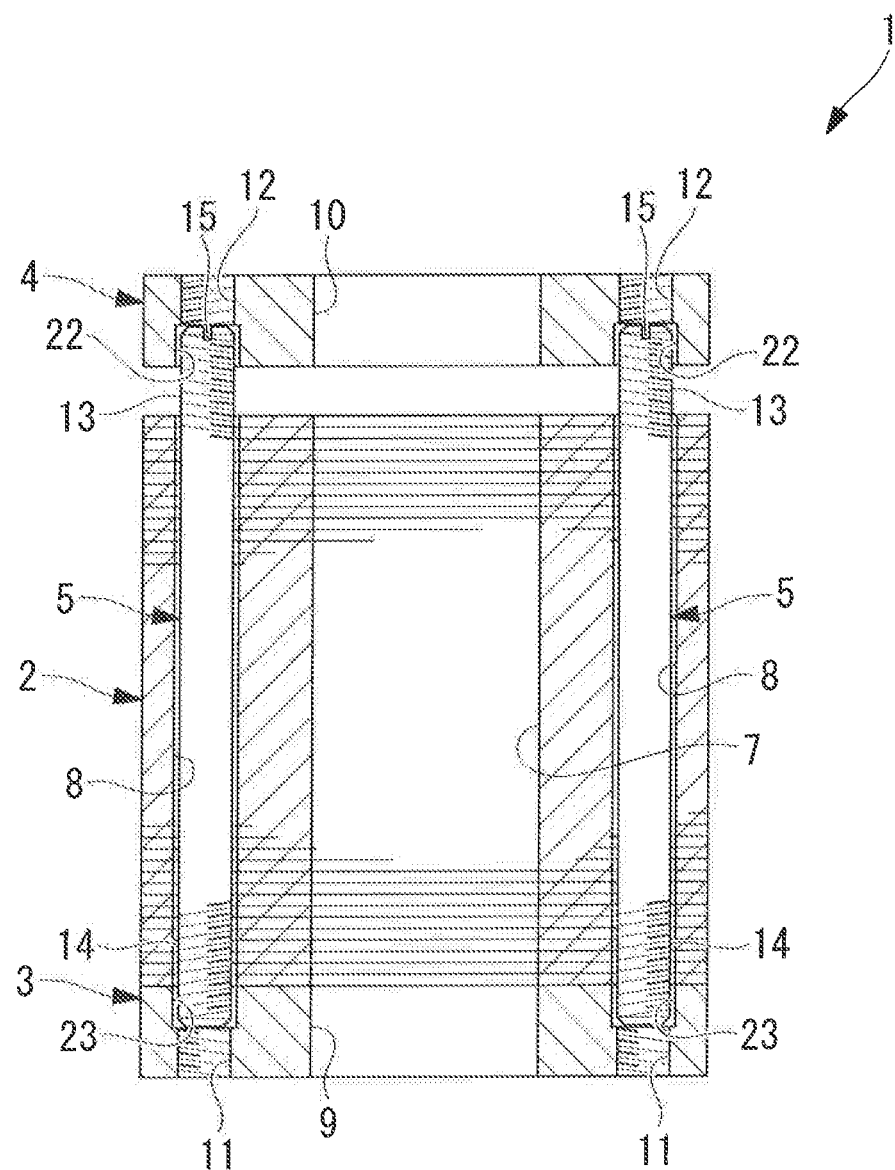
FIG. 7 is a longitudinal cross-sectional diagram showing a third modified example of the stator shown in FIG. 1, and shows a case where guide hole portions are provided in housings.

Furthermore, as shown in FIG. 7, in the present embodiment, guide hole portions 22, 23 having a certain inner diameter dimension that is slightly larger than an outer diameter dimension of the male threads 13, 14 may be provided in parts of respective housings 3, 4, on the stator core 2 sides of the screw holes 11, 12, so as to have a predetermined depth dimension. By partially accommodating both ends of the tightening rod 5 in the guide hole portions 22, 23, as shown in FIG. 7, an advantage that the stator core 2 and the pair of housings 3, 4 may be simply and easily arranged in a positioned state with the tightening rod 5 as the guide.

The inventor has arrived at the following aspects of the present invention.

An aspect of the present invention provides a stator including a stator core that is formed by stacking a plurality of steel sheets each having a through hole penetrating the steel sheet in its thickness direction; a pair of housings that are arranged at positions sandwiching the stator core in a stacking direction, each housing including a screw hole arranged at a position aligning with the through hole; and a tightening rod that penetrates the through hole of the stator core and that includes male threads that are respectively screwed into the screw holes of the housings, wherein the male thread on one end of the tightening rod is a right-hand thread, and the male thread on another end is a left-hand thread, and wherein an engaging portion that is engaged with a tool for turning the tightening rod around a longitudinal axis of the tightening rod is provided in at least one end surface of the tightening rod.

According to the present aspect, one of the housings is arranged at one end, in the stacking direction, of the stator core with the screw hole aligning with the through hole of the stator core, the tightening rod is arranged to penetrate the through hole of the stator core, the other of the housings is arranged with the screw hole aligning with an end portion of the tightening rod that is exposed from the other end of the stator core, and the tightening rod is turned in one direction around the longitudinal axis thereof by engagement of a tool with the engaging portion, and tightening is thus performed by the male threads on respective ends of the tightening rod meshing with female threads of the pair of housings at the same time.

Accordingly, the pair of housings may be fixed in a manner compressing the stator core from both sides in the stacking direction, by a simple operation of turning the tightening rod in one direction.

In this case, the tightening force of the tightening rod is generated by tightening of the male threads on the both ends and the screw holes of the housings, and thus, there is no need to provide a bolt seat surface in the housings, and the space may be saved by eliminating a space for forming a bolt seat surface, and an increase in the size of the housings may be prevented, and the electric motor may be miniaturized.

According to the aspect described above, the male threads on the both ends of the tightening rod may have different pitches.

This allows the tightening lengths, in the screw holes, of the male threads on the both ends of the tightening rod at the time of turning the tightening rod around the longitudinal axis may be made different from each other.

In the case of fixing the pair of housings to respective ends of the stator core by a plurality of tightening rods, the plurality of tightening rods have to be tightened at the same time, or tightening has to be sequentially performed little by little. In the latter case, if tightening of a male thread with a greater pitch into the screw hole of one housing is started in a state where a male thread with a smaller pitch is temporarily tightened into the screw hole of the other housing, the amount of movement of the tightening rod in the longitudinal axis direction may be made small, and occurrence of shift between tightening rods, in the axial direction, may be suppressed, and ease of tightening may be increased.

Also, according to the aspect described above, the male thread whose pitch is smaller may be the right-hand thread, and wherein the engaging portion may be provided in the end surface on a side of the male thread whose pitch is greater.

This allows, in the case of performing tightening of the male threads on both ends from a state where the male thread with the smaller pitch is temporarily screwed into the screw hole of one housing, the male threads on both ends of the tightening rod to be screwed into the screw holes by a normal tightening operation of tightening the right-hand thread, by engaging a tool with the engaging portion provided on the side of the male thread with the greater pitch.

Also, according to the aspect described above, the male threads on the both ends of the tightening rod may have different numbers of turns.

This prevents, in the case of performing tightening of the male threads on both ends from a state where the male thread with a larger number of turns is temporarily screwed into the screw hole of one housing, occurrence of a situation where there is not sufficient male thread on the temporarily tightened side at the end of tightening.

Furthermore, according to the aspect described above, the male thread whose number of turns is greater may be the right-hand thread, and the engaging portion may be provided in the end surface on a side of the male thread whose number of turns is smaller.

This allows, in the case of performing tightening of the male threads on both ends from a state where the male thread with the larger number of turns is temporarily screwed into the screw hole of one housing, the male threads on both ends of the tightening rod to be screwed into the screw holes by a normal tightening operation of tightening the right-hand thread, by engaging a tool with the engaging portion provided on the side of the male thread with the smaller number of turns.

Furthermore, according to the aspect described above, a guide hole portion having an inner diameter that is slightly larger than an outer diameter of the male thread may is provided in each of the screw holes provided in the housings, and each guide hole portion is provided at a stator core side in the screw hole.

This allows the stator core and the pair of housings to be easily positioned with respect to one another, by partially inserting, into the guide hole portion provided in each housing, each end portion of the tightening rod that is arranged in a state of penetrating the through hole of the stator core.

Moreover, another aspect of the present invention provides an electric motor including any of the stators described above.

The aforementioned aspects achieve an effect that miniaturization can be achieved by preventing an increase in the size of housings sandwiching electromagnetic steel sheets.

REFERENCE SIGNS LIST 1 stator
2 stator core
3, 4 housing
5 tightening rod
6 flathead screwdriver (tool)
8 through hole
11, 12, 18, 19 screw hole
13, 14, 16, 17, 20 21 male thread 15 slot (engaging portion)
22, 23 guide hole portion

The invention claimed is:
1. A stator of an electric motor comprising:
a stator core that is formed by stacking a plurality of steel sheets each having a through hole penetrating the steel sheet in its thickness direction, the steel sheets each having a center hole penetrating the steel sheet in the thickness direction at the center of the steel sheet, the center holes capable of accommodating a rotor of the electric motor;
a pair of housings that are arranged at positions sandwiching the stator core in a stacking direction, each housing including a screw hole arranged at a position aligning with the through hole; and
a tightening rod that penetrates the through hole of the stator core and that includes male threads that are respectively screwed into the screw holes of the housings,
wherein the male thread on one end of the tightening rod is a right-hand thread, and the male thread on another end is a left-hand thread, and
wherein an engaging portion that is engaged with a tool for turning the tightening rod around a longitudinal axis of the tightening rod is provided in at least one end surface of the tightening rod.

2. The stator according to claim 1, wherein the male threads on the both ends of the tightening rod have different pitches.

3. The stator according to claim 2,
wherein the male thread whose pitch is smaller is the right-hand thread, and
wherein the engaging portion is provided in the end surface on a side of the male thread whose pitch is greater.

4. The stator according to claim 1, wherein the male threads on the both ends of the tightening rod have different numbers of turns.

5. The stator according to claim 4,
wherein the male thread whose number of turns is greater is the right-hand thread, and
wherein the engaging portion is provided in the end surface on a side of the male thread whose number of turns is smaller.

6. The stator according to claim 1, wherein a guide hole portion having an inner diameter that is slightly larger than an outer diameter of the male thread is provided in each of the screw holes provided in the housings, and each guide hole portion is provided at a stator core side in the screw hole.

7. An electric motor comprising a stator according to claim 1.

* * * * *